United States Patent Office 3,110,722
Patented Nov. 12, 1963

3,110,722
MANUFACTURE OF NITRILES
Willem Brackman, Haarlem, Netherlands, assignor to Shell Oil Company, New York, N.Y., a corporation of Delaware
No Drawing. Filed May 23, 1960, Ser. No. 30,779
Claims priority, application Netherlands July 2, 1959
6 Claims. (Cl. 260—465)

This invention relates to the preparation of nitriles. In particular, this invention is a new and improved process for the preparation of nitriles by the oxidative reaction of alcohols and aldehydes with ammonia.

The general reaction of aldehydes with ammonia to produce nitriles is well known in the art. However, to effect the reaction to give practical yields of nitriles, it has been considered necessary by the prior art to conduct the reaction at high temperatures and in the vapor phase, using solid catalysts. Such processes are subject to the objections to any process which is conducted under such stringent conditions—that is, special process equipment is required. Further, these vapor phase processes are open to certain difficulties. For example, the solid catalysts which have been used all tend to become deactivated quite rapidly, resulting in reduced conversions and yields, requiring longer reaction times, which may result in increased loss of product due to side reactions.

A process which avoids these difficulties now has been discovered. Thus, it has been found that aldehydes react readily with ammonia to form the corresponding nitriles if the reaction is conducted in alkaline liquid phase in the presence of cupric ion. The aldehyde and ammonia react to form the nitrile, while the cupric ion is reduced to the cuprous ion. Described generally, this aspect of the process comprises reacting ammonia with a member of the group consisting of aldehydes and alcohols in alkaline liquid phase in the presence of molecular oxygen and of copper ion. The reaction goes forward readily at temperatures below about 100° C. It has been further discovered that the cuprous ion can be oxidized to the cupric ion by molecular oxygen in situ in the reaction mixture without interference with the reaction of the aldehyde and the ammonia. Thus, catalytic, rather than stoichiometric, amounts of the cupric ion can be used. Still further, it has been found that the corresponding alcohol can be substituted for the aldehyde, the alcohol apparently being oxidized to the aldehyde in situ in the reaction mixture.

The results of these discoveries is an operationally simple, effective process for the preparation of nitriles from ammonia and either aldehydes or the corresponding alcohols under very mild conditions employing a readily available catalyst which is not known to be deactivated during its use. A preferred aspect of this process—one which is quite suited to the large-scale preparation of nitriles—comprises intimately contacting a molecular oxygen-containing gas with an alkaline liquid phase reaction mixture containing the aldehyde or its corresponding alcohol, ammonia and cupric ion and recovering the nitrile of the aldehyde from the resulting reaction mixture.

It is believed that the reaction of the ammonia with the aldehyde in the process of this invention proceeds as follows:

(1) 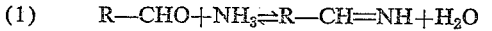   R—CHO+NH$_3 \rightleftharpoons$ R—CH=NH+H$_2$O (2)    R—CH=NH+OH$^- \rightleftharpoons$ R—CH=N$^-$+H$_2$O (3) 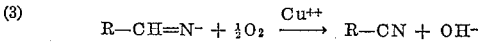   R—CH=N$^-$ + ½O$_2$ $\xrightarrow{Cu^{++}}$ R—CN + OH$^-$ wherein R represents the organic residue of the aldehyde. It is to be undestod that while the above equations represent the aldehyde as a monoaldehyde, this has been done only for the sake of simplicity and clarity of description. Polyaldehydes, as well as monoaldehydes, and their poly- as well as mono-alcohol precursors, are suitable as the aldehyde starting material in the process of this invention.

While the process of this invention effects the general conversion of aldehydes and alcohols to the corresponding nitriles, it is of particular interest for effecting the conversion of aromatic aldehydes and the corresponding aryl methanols (aryl-CH$_2$OH) to the corresponding nitriles. The aromatic aldehydes and aryl methanols which are substituted by one or more non-hydrocarbon substituents are suitable, as well as the unsubstituted and hydrocarbon-substituted aromatic aldehydes and aryl methanols, provided that such non-hydrocarbon substituent or substituents do not ionize greatly under alkaline conditions. Of the non-hydrocarbon substituents, the middle halogens—chlorine and bromine—and the nitro radical are chiefly of interest, since the aromatic nitriles containing one or more of these substituents have desirable properties as agricultural chemicals, particularly as plant growth-regulating agents. While the aromatic aldehyde or aryl methanol suitably can be polynuclear, because of the commercial importance of the mononuclear aromatic nitriles the mononuclear aromatic aldehydes and aryl methanols are preferred. The simplest unsubstituted mononuclear reactant of this type of course contains seven carbon atoms, while the simplest polynuclear reactant of this type of course contains ten carbon atoms. The hydrocarbon substituted aromatic reactants of this type suitably can contain twenty carbon atoms, or even more. The hydrocarbon substituents can be cyclic or either straight-chain or branched-chain aliphatic, and where cyclic can be either aromatic or alicyclic. The aliphatic and alicyclic substituents suitably may be saturated, or they may be olefinically unsaturated. Phenyl and alkyl substituted aromatic reactants of this kind wherein the alkyl substituent or substituents contain a total of not more than ten carbon atoms are of particular interest because of the desirable properties of the nitriles prepared therefrom.

In the aliphatic series, the saturated hydrocarbon aldehydes and alcohols are of greatest interest because of the importance of the corresponding nitriles. In these reactants, the aliphatic group can be straight-chain or branched-chain in configuration, and the aldehyde group can be bonded to a primary, a secondary, or a tertiary carbon atom. The alcohols of course will be primary alcohols. Such aliphatic reactants containing one or more aromatic and/or alicyclic substituent groups also are suitable. Suitably, the aliphatic reactant can contain up to twenty or even more carbon atoms. The corresponding alicyclic aldehydes and alcohols also are suitable, though of course in these reactants, the carbon atom to which the aldehyde group is bonded will be a secondary or tertiary carbon atom.

Typical aldehyde and alcohol reactants thus include, for example, benzyl alcohol, benzaldehyde, the various isomeric monochloro and monobromo benzyl alcohols and benzaldehydes, the various isomeric polychloro and polybromo benzyl alcohols and benzaldehydes, particularly 2,6-dichlorobenzaldehyde and 2,6-dibromobenzaldehyde, the various isomeric mono- and poly-nitro-benzaldehydes and benzyl alcohols, mixed nitro- and chloro- and/or bromo-substituted benzaldehydes and benzyl alcohols, the various isomeric alkyl-substituted benzyl alcohols and benzaldehydes, such as p-methylbenzaldehyde, 4-methyl-3,5-dichlorobenzaldehyde, and m-isopropylbenzaldehyde, furfural, heptaldehyde, butyraldehyde, isobutyraldehyde, propionaldehyde, trimethyl acetaldehyde, anisaldehyde, piperonal, methyl phenyl acetaldehyde, glutaraldehyde, and the like.

Reaction of the aldehyde with the ammonia to form the nitrile is effected by means of cupric ion. Where the resulting cuprous ion is not to be oxidized to cupric ion in situ, it is of course necessary to treat the cupric ion as a reactant and not as a catalyst. Consequently, at least two equivalents of cupric ion are furnished per equivalent of aldehyde to be reacted, and in general a moderate—say ten to fifty percent—excess of cupric ion is advantageously used to insure efficient reaction. Where the cuprous ion is to be oxidized in situ, a catalytic amount of cupric ion is all that is required. At least about 0.01 mole of cupric ion should be supplied per mole of aldehyde or alcohol used. It will seldom be necessary to supply more than about 0.25 mole of cupric ion per mole of the aldehye or alcohol, more than 0.15 mole of cupric ion per mole of aldehyde or alcohol usually not leading to commensurate additional advantage. In most cases, from about 0.03 to about 0.10 mole of cupric ion per mole of aldehyde or ketone used will be found suitable. It is belived that the cupric ion is present in the reaction mixture as a complex with ammonia. Suitable as the source of the cupric ion is any readily water-soluble cupric salt which will form a complex with ammonia. Cupric chloride is preferred because of its ready availability and its desirable solubility characteristics.

The liquid reaction mixture must be alkaline, and this alkalinity is ordinarily most effectively insured through the use of a strongly alkaline material having the strength of alkali metal alcoholates of lower alkanols or alkali metal oxides or hydroxides. Quaternary ammonium bases also are suitable, weaker bases such as primary, secondary and tertiary amines being less usitable. The amount of the base to be used will depend upon the desired alkalinity of the reaction mixture. The reaction mixture should be definitely alkaline—that is, the mixture should contain at least about 0.05 mole of base per liter of the mixture. However, in general, the mixture need not be more alkaline than provided by about 0.5 mole of base per liter of the mixture. In most cases, an alkalinity provided by from about 0.1 to about 0.3 mole of base per liter of the mixture will be found most suitable.

At least the stoichiometric amount of ammonia must be provided, and in general it is desirable to provide a substantial excess—of the order of from about 100 to about 2000 percent excess. In the usual case, an excess of from about 400 to about 1000 percent will be found most suitable.

The requisite liquid reaction mixture may in some cases be provided by the reactant aldehyde or alcohol, but in general it is desirable to provide a different liquid as solvent. Any non-acidic organic liquid which is a good solvent for copper-ammonia and copper-amine complexes is suitable. Methanol is most preferred because it is the best solvent for such complexes which is commonly available.

Where the cuprous ion is to be oxidized to cupric ion in situ, the amount of molecular oxygen-containing gas provided should be at least that sufficient to oxidize the cuprous ion to cupric ion. Ordinarily, it will be found advantageous to provide a substantial excess of molecular oxygen. Thus, it ordinarily will be found most efficient to merely insure the presence of molecular oxygen in the reaction mixture at all times. As the source of molecular oxygen, any gas containing a substantial proportion of molecular oxygen is suitable. Thus air, oxygen-enriched air, or the like are quite suitable. Use of substantially pure molecular oxygen is often advantageous so that no inert gas is introduced into the reaction zone.

According to the process of this invention, the reaction of the aldehyde or alcohol with the ammonia will go forward at relatively low temperatures, ordinary room temperature, or slightly above, being suitable in many cases. Conduct of the reaction at temperatures not exceeding about 60° C. is desirable in most cases since at these temperatures substantially atmospheric, or slightly greater, pressures can be used. At higher temperatures, higher pressures are encountered because of the ammonia pressure and because higher pressure is needed to maintain the reaction mixture in liquid state. To obtain desirably high reaction rates, it ordinarily will be found necessary to use a temperature above about 0° C. In the usual case, a temperature of from about 15° C. to about 50° C. will be found quite satisfactory, rate-wise, and most convenient, operation-wise.

Recovery of the nitrile product is in most cases effectively and conveniently done by diluting the final reaction mixture with water. The nitrile product precipitates, or is readily extracted with a solvent, such as diethyl ether.

It has been found convenient to conduct the reaction by preparing a solution or suspension of the base in the solvent, mixing it with part or all of the ammonia, mixing the resulting mixture with the copper salt, then further mixing in the aldehyde or alcohol reactant, and mixing in any remaining portion of the ammonia. If the cuprous ion is to be oxidized in situ, the molecular oxygen-containing gas is thoroughly and intimately brought into contact with the liquid reaction mixture. In practice, in any particular instance, it may be found desirable and/or convenient to conduct the reaction in some other way, and this can readily be done. Where the aldehyde or alcohol reactant has an alpha hydrogen atom—that is, a hydrogen atom bonded to the carbon atom to which the aldehyde or hydroxyl group is bonded—it is desirable that the aldehyde or alcohol not be brought into contact with the base alone, since condensation side-reactions may occur.

Further, it may be noted that it is desirable to limit the amount of water which is present in the reaction mixture prior to recovery of the product nitrile, since large concentrations of water tend to promote undesirable side-reactions—which can reduce the yield of nitrile. In general, the amount of water in the reaction mixture should not exceed about five percent of the volume thereof and desirably the reaction mixture is maintained in a substantially anhydrous condition.

The foregoing constitutes the detailed description of the process of this invention. The conduct of that process in particular instances is illustrated by the following examples, which are included only for the purpose of illustration.

*Example I*

Benzaldehyde was dissolved in a solution of 0.77% by weight of $CuCl_2 \cdot 2H_2O$, 1.82% by weight of $NaOCH_3$ and 7.65% by weight of ammonia in 77.9% by weight of methanol until the mixture contained 11.8% by weight benzaldehyde.

Oxygen was contacted with the solution for 23 hours with intensive stirring at a temperature of 30° C. at atmospheric pressure. The mixture was then poured out into a 5-fold excess of water. The nitrile (79% based on the aldehyde) was extracted with ether and distilled. The boiling range of the resultant benzonitrile was 185–188° C.

*Example II*

2,6-dichlorobenzaldehyde was dissolved in a solution of 0.84% by weight of $CuCl_2 \cdot 2H_2O$, 2% by weight of $NaOCH_3$ and 8.4% by weight of ammonia in 86.2% by weight of methanol until the mixture contained 2.74% by weight of the aldehyde.

Oxygen was contacted with the solution for four hours with intensive stirring at a temperature of 30° C. at atmospheric pressure. The mixture was then shaken with a 5-fold excess of water. The precipitated 2,6-dichlorobenzonitrile (76%, based on the aldehyde) was filtered off and was substantially pure (melting point 142–143° C). Another fraction may also be obtained from the filtrate by acidification and extraction with ether.

In a series of similar experiments, benzonitrile was prepared from benzyl alcohol, p-methoxybenzonitrile was prepared from anisaldehyde, 3,4-methylene dioxybenzonitrile was prepared from piperonal, o-nitrobenzonitrile was prepared from o-nitrobenzaldehyde, 2,6-dichlorobenzonitrile was prepared from 2,6-dichlorobenzyl alcohol, 1-cyanofuran was prepared from furfural, n-hexyl nitrile was prepared from n-heptanal, propionitrile from propionaldehyde, and butyronitrile was prepared from butyraldehyde.

I claim:
1. A process for preparing aromatic nitriles which comprises contacting at least a stoichiometric amount of ammonia with an aromatic aldehyde selected from the group consisting of benzaldehyde, monochlorobenzaldehyde, monobromobenzaldehyde, 2,6-dichlorobenzaldehyde, 2,6-dibromobenzaldehyde, mononitrobenzaldehyde, p-methylbenzaldehyde, 4-methyl-3,5-dichlorobenzaldehyde, m-isopropylbenzaldehyde, and anisaldehyde, in an alkaline liquid phase reaction mixture which contains at least about 0.05 mole per liter of reaction mixture of a base selected from the group consisting of alkali metal alcoholates of lower alkanols, alkali metal oxides, alkali metal hydroxides, quaternary amonium salts, primary amines, secondary amines, and tertiary amines, in the presence of at least a stoichiometric amount of cupric ion derived from a water-soluble cupric salt, at a temperature below 100° C., and in the substantial absence of oxygen.

2. A process for preparing aromatic nitriles which comprises contacting at least a stoichiometric amount of ammonia with an aromatic aldehyde selected from the group consisting of benzaldehyde, monochlorobenzaldehyde, monobromobenzaldehyde, 2,6-dichlorobenzaldehyde, 2,6-dibromobenzaldehyde, mononitrobenzaldehyde, p-methylbenzaldehyde, 4-methyl-3,5-dichlorobenzaldehyde, m-isopropylbenzaldehyde, and anisaldehyde, in an alkaline liquid phase reaction mixture which contains at least about 0.05 mole per liter of reaction mixture of base selected from the group consisting of alkali metal alcoholates of lower alkanols, alkali metal oxides, alkali metal hydroxides, quaternary ammonium salts, primary amines, secondary amines, and tertiary amines, at a temperature below 100° C. in the presence of molecular oxygen and in the presence of at least a catalytic amount of cupric ion derived from a water-soluble cupric salt.

3. A process for preparing benzonitrile which comprises reacting at least a stoichiometric amount of ammonia with benzaldehyde in alkaline liquid phase in the presence of cupric ion at a temperature below 100° C.

4. A process for preparing benzonitrile which comprises reacting at least a stoichiometric amount of ammonia with benzaldehyde in alkaline liquid phase in the presence of molecular oxygen and of copper ion at a temperature below 100° C.

5. A process for preparing 2,6-dichlorobenzonitrile which comprises contacting at least a stoichiometric amount of ammonia with 2,6-dichlorobenzaldehyde in an alkaline liquid phase reaction mixture which contains at least about 0.05 mole per liter of reaction mixture of a base selected from the group consisting of alkali metal alcoholates of lower alkanols, alkali metal oxides, alkali metal hydroxides, quaternary ammonium salts, primary amines, secondary amines, and tertiary amines, at a temperature below 100° C., in the presence of molecular oxygen and in the presence of at least a catalytic amount of cupric ion derived from a water-soluble cupric salt.

6. A process for the preparation of 2,6-dichlorobenzonitrile which comprises contacting at least a stoichiometric amount of ammonia with 2,6-dichlorobenzaldehyde in an alkaline liquid phase reaction mixture of a base selected from the group consisting of alkali metal alcoholates of lower alkanols, alkali metal oxides, alkali metal hydroxides, quaternary ammonium salts, primary amines, secondary amines, and tertiary amines, in the presence of at least a stoichiometric amount of cupric ion derived from a water-soluble cupric salt, at a temperature below 100° C. and in the substantial absence of oxygen.

References Cited in the file of this patent
UNITED STATES PATENTS

| | | |
|---|---|---|
| 2,337,421 | Spence et al. | Dec. 21, 1943 |
| 2,443,420 | Gresham | June 15, 1948 |
| 2,786,867 | Hagemeyer et al. | Mar. 26, 1957 |